United States Patent [19]
Krigbaum

[11] 3,817,463
[45] June 18, 1974

[54] TIRE SHREDDING DEVICE

[75] Inventor: Clarences A. Krigbaum, Houston, Tex.

[73] Assignee: Tire-Gator, Inc., Houston, Tex.

[22] Filed: Sept. 15, 1972

[21] Appl. No.: 282,191

Related U.S. Application Data

[63] Continuation-in-part of Ser. No. 134,717, April 16, 1971, Pat. No. 3,727,850.

[52] U.S. Cl. .................... 241/152 R, 241/159
[51] Int. Cl. ................ B02c 13/02, B02c 19/00
[58] Field of Search ........... 241/152 R, 152 A, 155, 241/157, 235, 236, DIG. 31

[56] References Cited
UNITED STATES PATENTS

| | | | |
|---|---|---|---|
| 1,494,036 | 5/1924 | Straub | 241/235 X |
| 3,656,697 | 4/1972 | Nelson | 241/236 X |
| 3,727,850 | 4/1973 | Krigbaum | 241/159 |

FOREIGN PATENTS OR APPLICATIONS

| | | | |
|---|---|---|---|
| 433,001 | 8/1935 | Great Britain | 241/152 R |

Primary Examiner—Roy Lake
Assistant Examiner—E. F. Desmond
Attorney, Agent, or Firm—Laurence R. Brown

[57] ABSTRACT

A device for shredding used tires to reduce the tires to small pieces for easy disposal, wherein the whole tires are reduced to strips by cutters and tear strips, and subjected to a second treatment to reduce the strips to small pieces by cutting and tearing.

2 Claims, 2 Drawing Figures

PATENTED JUN 18 1974 3,817,463

TIRE SHREDDING DEVICE

BACKGROUND OF THE INVENTION

This application is a continuation in part of my application for patent filed Apr. 16, 1971, Ser. No. 134,717, on a scrap shredding device, now U.S. Pat. No. 3,727,850, issued Apr. 17, 1973.

SUMMARY OF THE INVENTION

A device for shredding used tires comprising a plurality of pairs of counter rotating discs, each pair of discs having one flat peripheral face, opposing which the counter rotating disc presents a cutter, said cutters being detachably mounted on said discs.

DESCRIPTION OF THE PREFERRED EMBODIMENT

Figure 1:
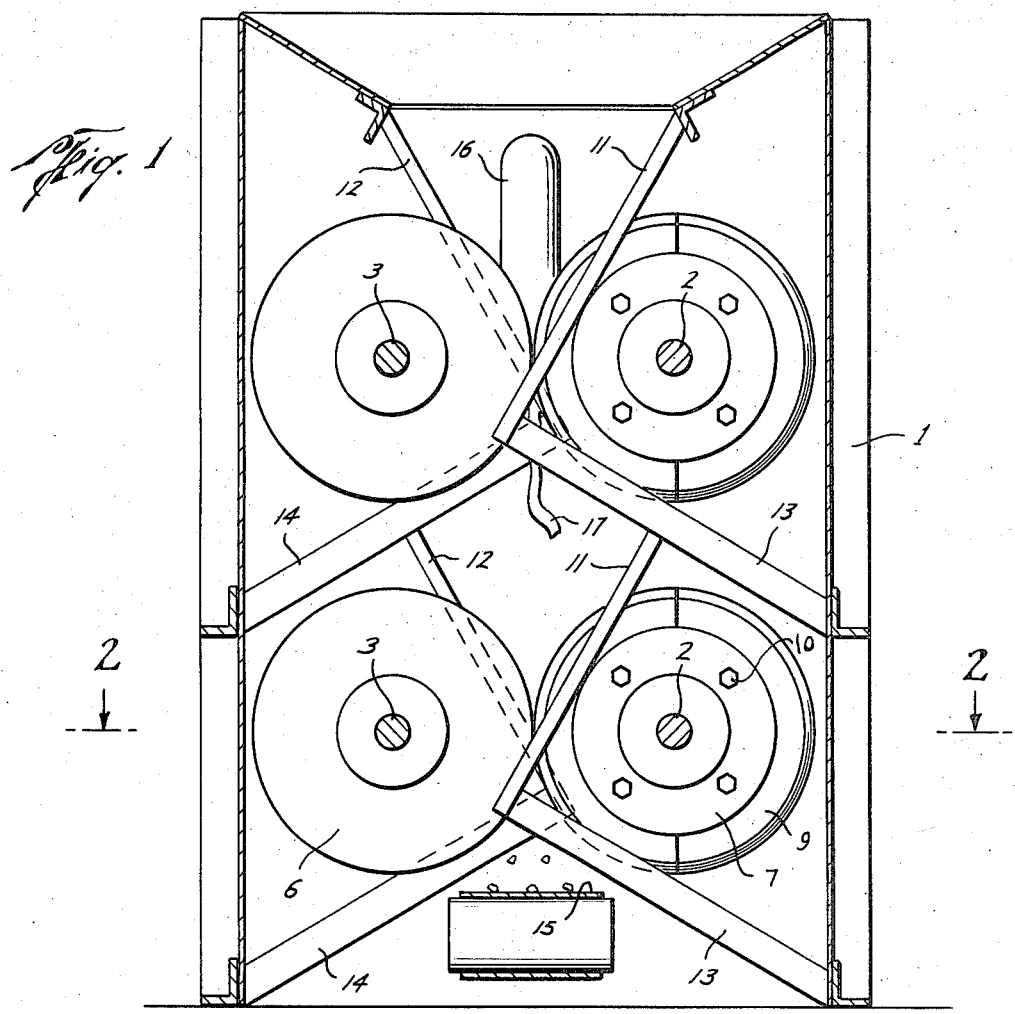
FIG. 1 is a side elevational view of the device, partially in cross section.
Figure 2:
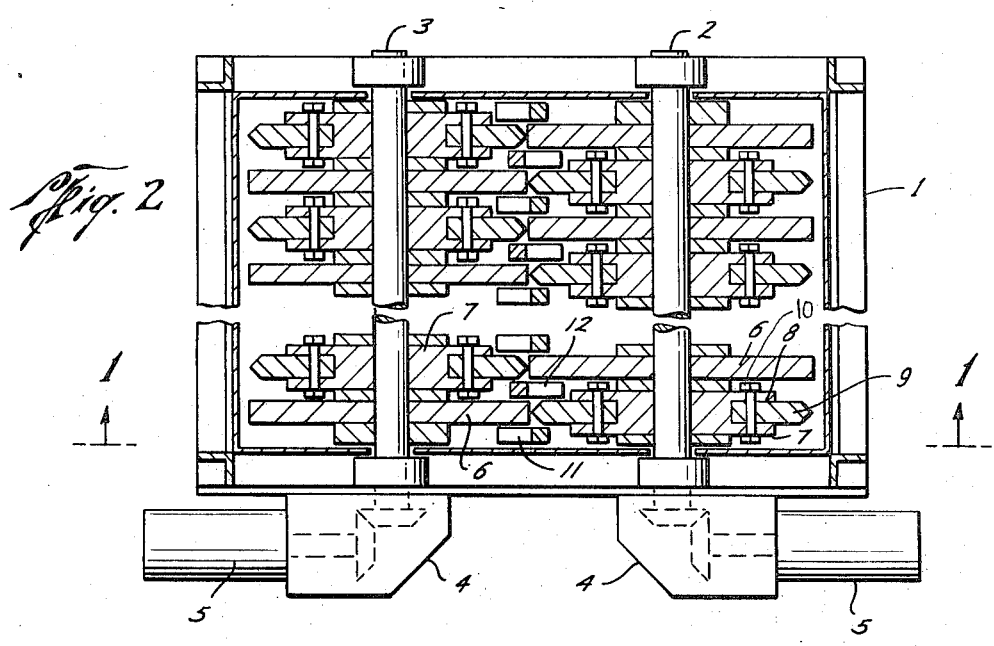
FIG. 2 is a top plan view of the device, taken on the line 2—2 of FIG. 1, and being partially in cross section.

In the drawings, the numeral 1 designates a frame in which the axles 2, 2, 3, 3 are mounted. Gear boxes 4, 4 rotate the axles 2, 3 and in turn are driven by suitable means, such as the motors 5, 5. Mounted on the axles 2, 3 are the rotatable discs 6, 7 with the spacers 8 between said discs on the respective axles 2, 3. The discs 6, 7 are alternately positioned on the axles, so that a disc 6 is opposite a disc 7, as they rotate in opposite directions, and the discs on each axle alternate between flat face and cutter mounted discs. The discs 7 are grooved peripherally as at 8 and semi-annular cutters 9 are mounted in the grooves by means of the bolts 10.

Beside each side of the cutter and flat face discs are the tear strips 11, 12, which are braced to the framework by the braces 13, 14. A conveyor belt 15 removes the shredded pieces to a suitable container (not shown) outside of the framework.

When a tire to be shredded, as 16, is placed on the upper rotating discs 6, 7, the cutters 9 sever the cord and reinforcing material of the tire, starting a cut, and the friction between the material of the tire and the rotating discs, drags the cut strip against the tear strips, and the tearing action continues, with the torn strips passing between the banks of discs and drops to the lower bank, where the action is repeated against the strips, the cutters bearing against the flat faces of the opposing discs starting the cut, and the tear strips continuing the tear in the material leaving small particles which pass between the banks of discs and onto the conveyor belt.

Each alternate tear strip is angled downwardly and outwardly, so that the pull against the material on each side of the cut is in opposite directions.

What I claim is:

1. In a tire shredding device, a framework, a series of pairs of counter rotating discs opposingly mounted in said framework, axles on which said discs rotate, one disc of each pair having cutters detachably mounted in the peripheral face thereof, and the other disc of each pair having a flat peripheral face, tear strips mounted between each pair of discs and which guide the cut pieces of tire in opposite directions to tear said material as a cut is formed.

2. In a tire shredding device, a framework, a series of pairs of counter rotating discs opposingly mounted in said framework, axles on which said discs rotate, one disc of each pair having cutters detachably mounted in the peripheral face thereof, and the other disc of each pair having a flat peripheral face, tear strips mounted on said framework and extended downwardly at an angle between each pair of discs, the direction of the angle of said strips alternating progressively and longitudinally of said axles.

* * * * *